UNITED STATES PATENT OFFICE.

WALTER O. SNELLING, OF PITTSBURGH, PENNSYLVANIA.

FOOD PRODUCTS.

1,199,124.　　　　　Specification of Letters Patent.　　Patented Sept. 26, 1916.

No Drawing.　　　Application filed April 3, 1915. Serial No. 19,041.

*To all whom it may concern:*

Be it known that I, WALTER O. SNELLING, a citizen of the United States, and a resident of Pittsburgh, in the county of Allegheny and State of Pennsylvania, have invented a new and useful Improvement in Food Products, of which the following is a specification.

My invention relates to the manufacture of food products, and it has special reference to the preparation of foods from raw materials that can be cooked by frying in liquid fats or oils, or by treatment with hot oil vapors.

One object of my invention is to provide a process of making thoroughly cooked, desiccated and comminuted food products from vegetable and animal raw materials.

Another object of my invention is to provide a process of preparing nutritious and healthful fried food products that shall be palatable and free from oleaginous material.

A further object of my invention is to prepare new and agreeable food products of the above-indicated character which shall be adapted to be eaten in a variety of forms.

My process consists essentially in subjecting a suitable food material to the action of hot fat or oil, or to the action of hot oily vapors, until the food is thoroughly cooked and substantially free from moisture, and then extracting the absorbed fat or oil from the food, which leaves a cooked, dry food product that is entirely free from fat.

The foregoing process may be employed in preparing many kinds of food materials, but it is especially suitable for the treatment of starchy foodstuffs, notably potatoes, and in order to illustrate my process, I shall describe the preparation of fat-free potato flakes and potato flour.

The potatoes are first pared and cut into thin slices, cooked to a very dry condition in hot oil or hot oily vapors, and then drained to remove as much oil as possible. At this stage, the slices resemble the familiar potato chips, and contain a considerable amount of grease. The next step in my process consists in extracting the oily material from the fried potato slices, prepared in the manner described above, and thereby producing a food product having valuable and entirely new properties. For this purpose, I preferably treat the cooked and drained potato slices with a hot, volatile solvent, until they are substantially degreased, and finally remove the solvent by warming the slices under sub-atmospheric pressure. In this manner, I produce desiccated and absolutely greaseless potato chips, which have a new and agreeable flavor, and which form an excellent breakfast food with sugar and cream. The greasy after-taste that is characteristic of ordinary potato chips is entirely absent.

My novel greaseless potato chips may be readily ground into meal or flour, and these ground products form excellent ingredients in the preparation of many foods. For example, flour made from my greaseless product forms a very desirable addition to wheat flour in making break, pastries and the like, in which the flavor of the cooked potato is highly agreeable. It may even be substituted largely for wheat flour, and since the potato starch is thoroughly cooked during its manufacture, baked products prepared from this flour are exceptionally digestible. This fact renders my potato flour especially suitable for making health foods, ration biscuits and the like, in which the greatest possible digestibility is required.

Since my fat-free products contain no decomposable grease and are sterile media for the propagation of ferments and bacteria, they will keep indefinitely in a sweet and unchanged condition. My products are superior, in this respect, to all foods that have heretofore been cooked with fats or oils, because the residual oil in such foods, which is already partly decomposed in cooking, quickly becomes rancid. Ordinary potato chips, for example, must be eaten while fresh, and will develop an unpleasant rancid taste and odor in a few days, especially if exposed to the air. My potato products, both flakes and meal or flour, will keep for many months in ordinary pasteboard cartons without deteriorating in any way.

An interesting feature of my process of making degreased fried food products is that the oil used for frying need not be an edible fat or oil, but may, with equally good results, be a mineral oil such as the light or heavy lubricating oils, or even melted paraffin wax. These oils are much cheaper than animal or vegetable fats, and their use is in no way objectionable, since they are entirely removed from the cooked products.

Any suitable volatile solvent may be used for extracting the grease from the cooked food. I have obtained good results with ether and alcohol, and even better with light hydrocarbon solvents such as butane, pentane, and petroleum ether, which are more readily extracted from the food products and impart no taste to the food, as ether will do unless it is very carefully removed. Care should be taken that the solvent selected will only extract the absorbed grease, and will not dissolve the food that is being treated.

While I have described my process in connection with potato products, my invention is by no means limited to the treatment of potatoes, but may be applied to any foodstuff which can be cooked by frying and which can then be treated to remove its absorbed grease. All starchy foodstuffs, such as corn, rice, wheat and other grains, decorticated if necessary, are suitable starting materials. Meats may also be treated, especially for the production of desiccated meat powders.

In view of the wide range of modifications and adaptations of which my invention is capable, it is to be understood that no limitations are to be imposed thereon unless indicated in the appended claims.

I claim as my invention:

1. The process of preparing food products that comprises subjecting a food material to the action of a hot oleaginous fluid and subsequently degreasing the said material.

2. The process of preparing food products that comprises subjecting a starchy food material to the action of a hot oleaginous fluid and subsequently degreasing the said material.

3. The process of preparing food products that comprises subjecting potato to the action of a hot oleaginous fluid and subsequently degreasing the said potato.

4. The process of preparing food products that comprises subjecting potato to the action of a hot oleaginous fluid, and subsequently degreasing the said potato by means of a solvent.

5. The process of preparing food products that comprises subjecting a starchy food material to the action of a hot oleaginous fluid, subsequently degreasing the said material by means of a solvent, and removing the solvent by heating the material under sub-atmospheric pressure.

6. The process of preparing food products that comprises subjecting potato to the action of a hot oleaginous fluid, subsequently degreasing the said potato by means of a solvent and removing the solvent by heating the potato under sub-atmospheric pressure.

7. The process of preparing food products that comprises subjecting a food material to the action of a hot mineral oil, extracting the oil from the said material by means of a hydrocarbon solvent, and removing the solvent by heating the material under sub-atmospheric pressure.

8. The process of preparing food products that comprises cutting potatoes into thin slices, subjecting the slices to the action of a hot, oleaginous fluid until they are thoroughly cooked and freed from moisture, draining the cooked slices, extracting the absorbed oily material by means of a solvent and removing the solvent by heating the potato slices under sub-atmospheric pressure.

9. As a new article of manufacture, a food product cooked with oleaginous material but substantially free therefrom.

10. As a new article of manufacture, a starchy food product cooked with oleaginous material but substantially free therefrom.

11. As a new article of manufacture, a fat-free, fried food product.

12. As a new article of manufacture, a fat-free fried starchy food product.

13. As a new article of manufacture, fat-free fried potato.

14. As a new article of manufacture, fat-free comminuted fried potato.

In testimony whereof, I have hereunto subscribed my name this 1st day of April 1915.

WALTER O. SNELLING

Witnesses:
M. R. McKeown,
J. G. Kaiser.

Correction in Letters Patent No. 1,199,124.

It is hereby certified that in Letters Patent No. 1,199,124, granted September 26, 1916, upon the application of Walter O. Snelling, of Pittsburgh, Pennsylvania, for an improvement in "Food Products," an error appears in the printed specification requiring correction as follows: Page 1, line 71, for the word "break" read *bread;* and that the said Letters Patent should be read with this correction therein that the same may conform to the record of the case in the Patent Office.

Signed and sealed this 31st day of October, A. D., 1916.

[SEAL.]

Cl. 99—5.

R. F. WHITEHEAD,
*Acting Commissioner of Patents.*